United States Patent [19]
Lammerant et al.

[11] Patent Number: 5,682,991
[45] Date of Patent: Nov. 4, 1997

[54] CASSETTE FOR RECEIVING AT LEAST ONE COMPACT DISC

[75] Inventors: Henri Lammerant; Filip Lammerant, both of Thulin, Belgium

[73] Assignee: Cartonneries De Thulin S.A., Thulin, Belgium

[21] Appl. No.: 618,426

[22] Filed: Mar. 18, 1996

[30] Foreign Application Priority Data

May 10, 1995 [FR] France .............. 95 107 069.7

[51] Int. Cl.⁶ .......................... B65D 85/30; B65D 73/00
[52] U.S. Cl. ...................... 206/308.1; 206/310; 206/493
[58] Field of Search .................... 206/307, 307.1, 206/308.1, 309–313, 493

[56] References Cited

U.S. PATENT DOCUMENTS

| | | | |
|---|---|---|---|
| 3,951,264 | 4/1976 | Heidecker et al. | 206/309 |
| 4,535,888 | 8/1985 | Nusselder | 206/308.1 |
| 5,188,230 | 2/1993 | O'Brien et al. | 206/310 |
| 5,269,409 | 12/1993 | Brandt et al. | 206/311 |
| 5,285,893 | 2/1994 | Misterka et al. | |
| 5,383,553 | 1/1995 | Lammerant et al. | 206/309 |
| 5,402,882 | 4/1995 | Brandy et al. | 206/310 |
| 5,474,174 | 12/1995 | Lin | 206/310 |
| 5,477,960 | 12/1995 | Chen | 206/309 |

FOREIGN PATENT DOCUMENTS

| | | |
|---|---|---|
| 0114631 | 8/1984 | European Pat. Off. |
| 0515342 | 11/1992 | European Pat. Off. |
| 9201879 | 6/1992 | Germany |
| 9309103 | 9/1993 | Germany |
| 4210826 | 10/1993 | Germany |
| 9222065 | 12/1992 | WIPO |

*Primary Examiner*—Jacob K. Ackun
*Assistant Examiner*—Nhan T. Lam
*Attorney, Agent, or Firm*—Robert W. Becker & Associates

[57] ABSTRACT

A cassette for receiving a compact disc has a housing including a base and a cover whereby the cover is pivotably connected with the pivot connection to the base for opening and closing the housing. A plate insert is positioned in the housing and has securing elements for securing at least one compact disc thereat. The base has a rectangular bottom with opposite longitudinal edges. The base has upwardly extending first sidewalls connected to the longitudinal edges. The cover has a rectangular top wall extending parallel to the bottom. The top wall has opposite longitudinal edges with sidewalls connected thereto. The second sidewalls extend downwardly when the housing is closed. The plate insert has a rectangular base plate with opposite longitudinal edges. The rectangular base plate has lateral projections in a plane of the base plate at the longitudinal edges in an area where a compact disc secured at the plate insert is closest to the longitudinal edges. The lateral projections have at least at one side a support wall with an upper edge projecting upwardly past the compact disc secured at the plate insert.

21 Claims, 5 Drawing Sheets

CASSETTE FOR RECEIVING AT LEAST ONE COMPACT DISC

BACKGROUND OF THE INVENTION

The present invention relates to a cassette for receiving at least one disc with high density information stored or to be stored thereon (compact disc), wherein the cassette is comprised of a base and a cover that is pivotable relative to the base and forms a housing together with the base. A plate insert, provided with securing elements for the compact disc, is insertable into the housing. The base comprises a rectangular bottom having in the longitudinal direction oppositely arranged sidewalls at the edges. The cover comprises a rectangular top wall extending parallel to the bottom. The top wall also has sidewalls oppositely arranged at the longitudinal edges. The plate insert, which is also substantially rectangular, is provided in the area in which the circumference of the inserted compact disc is closest to the lateral edges with lateral projections. The lateral projections are provided at least at one side thereof with a reinforcement edge that extends along the outer edge of the lateral projection.

A cassette with these features is known from European Patent 0 515 342. The cassette is suitable for securing one or two compact discs, depending on the type of the plate insert, whereby in the case of securing two compact discs the plate is provided on both sides with securing elements in the form of elastic tongues. The cassette has outer dimensions in accordance with international convention so that it can be sorted and stored in respective storage devices which with respect to their main dimensions are substantially standardized.

The cassette disclosed in European Patent 0 515 342 is mainly used for storing compact discs for audio applications. However, compact discs have become more and more important as information carriers for computer applications (CD-ROM). While for the application of compact discs within the audio sector it is sufficient to provide the cassette with a small information booklet comprising only a few pages in regard to the music and artist, compact discs used as CD-ROM require manuals of considerable thickness and other information material. The cassette disclosed in European Patent 0 515 342 does not provide sufficient space for receiving such information material. When used for receiving a CD-Rom, the cassette thus does not contain the corresponding manual, the manual is simply placed on top and contained in a common cart box. This is dissatisfactory with respect to a plurality of considerations.

It is therefore an object of the present invention to provide a cassette for receiving at least one compact disc which cassette is able, while still conforming to the international conventional width and length, to receive a manual or other accompanying information material.

SUMMARY OF THE INVENTION

A cassette for receiving a compact disc according to the present invention is primarily characterized by:

A housing comprised of a base and a cover, the cover pivotably connected with a pivot connection to the base for opening and closing the housing;

A plate insert positioned in the housing, the plate insert having securing elements for securing a compact disc thereat;

The base having a rectangular bottom with opposite longitudinal edges;

The base having upwardly extending first sidewalls connected to the longitudinal edges;

The cover comprising a rectangular top wall extending parallel to the bottom, the top wall having opposite longitudinal edges;

The cover having second sidewalls connected to the longitudinal edges, the second sidewalls extending downwardly when the housing is closed;

The plate insert having a rectangular base plate with opposite longitudinal edges;

The rectangular base plate having lateral projections in a plane of the base plate at the longitudinal edges where a compact disc secured at the plate insert is closest to the longitudinal edges;

The lateral projections having at least at one side thereof a support wall with an upper edge projecting upwardly past a compact disc secured at the plate insert.

Preferably, the first sidewalls have cutouts for receiving the lateral projections when the housing is closed.

Advantageously, the second sidewalls have cutouts for receiving the lateral projections and the support walls when the housing is closed.

Preferably, when the housing is closed, the second sidewalls are positioned exterior to the first sidewalls, and the support walls have an inner side and the second side walls have an inner side, wherein the inner side of the support walls are positioned in a common plane with the inner side of the second sidewalls. The first sidewalls have an inner side. The inner side of the support walls are positioned outwardly relative to the inner side of the first sidewalls.

In another embodiment of the present invention, when the housing is closed, the second side walls are positioned exterior to the first sidewalls. The support walls have an inner side and the second sidewalls have an inner side, wherein the inner side of the support walls is positioned inwardly relative of the inner side of the second sidewalls. The first sidewalls have an inner side. The inner side of the support walls are positioned outwardly of the inner side of the first sidewalls.

Preferably, the support walls have an outer side and, when the housing is closed, the outer side is flush with the first and second sidewalls.

In yet another embodiment of the present invention, the support wall has rounded corners facing the cover when the housing is closed.

Advantageously, the plate insert has a central support for penetrating a central bore of the compact disc received in the housing. The central support has an upper rest for supporting a booklet placed between the compact disc and the top wall.

Preferably, the securing elements are connected to the central support. The securing elements may be elastic tongues arranged in an annular arrangement about the circumference of the central support.

Preferably, the plate insert has upwardly extending third sidewalls connected to the opposite longitudinal edges of the plate insert and extending parallel to and inwardly displaced relative to the support wall. The third sidewalls have upper end faces positioned at a same level as the upper rest.

Preferably, the plate insert comprises transverse edges extending perpendicular to the longitudinal edges. The transverse edges have short ribs extending parallel to the longitudinal edges toward the center of the plate insert. The short ribs have a height identical to the height of the central support.

In yet another embodiment of the present invention, the plate insert has a first and a second opposite plane sides, wherein the securing elements are positioned on the first and second opposite plane sides for securing a compact disc on each one of the opposite plane sides.

Advantageously, the plate insert has two first pivot pins and is connected with the pivot pins to the base so as be pivotable about a pivot angle relative to the base. The pivot angle is preferably approximately 180°.

Advantageously, the pivot connection comprises second pivot pins for pivoting the cover relative to the base. The first pivot pins and the second pivot pins are connected to the base at opposite ends of the first sidewalls.

Preferably, the second pivot pins are integrally connected to the second sidewalls of the cover. The second pivot pins have distal ends with a radial projection. The first sidewalls have two-step bores matching the pivot pins. The pins with the radial projection are completely received in the two-step bores.

Preferably, a pivot axis of the pivot connection is positioned above the center line of the cassette wherein the cover has a transverse edge extending parallel to the pivot axis adjacent to the pivot connection. The base has a transverse wall extending parallel to the pivot axis adjacent to the pivot connection. When the cover is pivoted into an open end position, the cover rests with a transverse edge on the transverse wall of the base at a location above the rectangular bottom.

Expediently, the cassette further comprises a grip ledge and a connecting portion for connecting the grip ledge to the rectangular base plate. The rectangular top wall of the cover has a slanted edge extending parallel to and facing the pivot axis of the pivot connection. The grip ledge extends parallel to the pivot axis and has a transitional portion providing a transition into the connecting portion. When the housing is closed, the slanted edge rests over its entire length on the transitional portion. The grip ledge, when the housing is closed, forms an extension of the top wall of the cover. The transitional portion may be rounded or beveled.

Preferably, the housing has outer edges and at least four of the outer edges are rounded so as to have the contour of a quarter circle.

The inventive cassette makes it possible that additional manuals or other accompanying information material having a thickness which is greater than the thickness of a conventional brochure contained in such cassettes can be enclosed in the inventive cassette. The inventive cassette can thus contain manuals having a thickness up to 8 mm while a conventional cassette for audio compact disks can contain brochures of a maximum thickness of 2 mm. Since the laterally extending reinforcement edges of the inventive cassette are enlarged at the center portion to provide a support wall, a secure lateral support of the manual contained in the cassette is possible. This manual may have the same main dimensions, i.e., the same width of approximately 120 mm as well as the same length of approximately 121 mm, as the conventional brochures contained in cassettes for audio compact discs. Furthermore, the length as well as the width of the cassette corresponds to internationally used dimensions, i.e., the same dimensions as the most commonly used "jewel box". These main dimensions include a length of 142.2 mm and a width of 124.6 mm. Only the thickness, respectively, height of the cassette is enlarged corresponding to the thickness of a manual to be placed therein and thus surpasses the conventional international dimension for the height of such cassettes. This difference in height, however, has no influence on the suitability of the cassette for storage in conventional storage shelves or stands.

Since the housing of the cassette as well as the information material to be place into the cassette meet the conventional international dimensions with respect to their two main dimensions, the furnishing of the cassette with information material and manuals is thus possible with conventional packing machinery and devices.

The support walls provided at the lateral projections of the plate insert received in the housing cause the width of the plate insert to be substantially identical to the total width of the housing. In order to prevent a collision of the support walls with the sidewalls of the housing, in one embodiment of the cassette it is thus suggested that the sidewalls of the base are provided with cutouts into which the lateral projections extend when the housing is closed. Depending on the thickness of the material of the support walls, it may further be necessary that the sidewalls of the cover are also provided with cutouts into which the lateral projections as well as the support walls supported thereat project when the housing is closed.

According to a further embodiment of the cassette, the sidewalls of the cover are positioned exterior to the major portions of the sidewalls of the base and the inner side of the support walls is positioned in a common plane or inwardly displaced relative to the inner side of the cover sidewalls and at the same time outwardly relative to the inner side of base sidewall. Due to this embodiment it is ensured that the support wall for laterally supporting the manual to be placed into the cassette is moved laterally outwardly to the maximum extent in order to thus provide sufficient inner width for inserting the compact disc and the manual.

The corners of the support wall which are facing the cover may be rounded so that, when a user grabs the contained manual, injuries resulting from sharp corners or edges are prevented. In order to avoid that the manual rests on the compact disc positioned underneath, it is suggested that the plate insert is provided with a centrally arranged central support, which preferably projects through the central hole of the inserted compact disc and provides an upper rest above the compact disc for supporting the manual or information material positioned between the plate insert and the top wall. Preferably, the securing elements for the compact disc are arranged at this central support. The securing elements may be spring-elastic tongues arranged at the circumference of the central support.

The compact disc is relieved from the weight of the manual positioned above by providing the plate insert with upwardly extending lateral third sidewalls extending parallel to and inwardly displaced relative to the support wall whereby their height is identical to the height of the central support. For the same purpose it is furthermore suggested that the plate insert in the area of the transverse edges extending transverse to the lateral edges is provided with short ribs extending parallel to the longitudinal edges toward the center of the plate insert. The short ribs have the same height as the central support. The inventive cassette can be used with plate inserts that receive only a single compact disc as well as with plate inserts that on either plane side are provided with fastening means for securing thereat a compact disc. In order to be able to access both compact discs easily, the plate insert can be provided with pivot pins so as to be pivotable relative to the base, preferably by a pivot angle of approximately 180°. In this case, the pivotability between the base and the cover, respectively, the base and the plate insert is realized with pivot pins which are positioned at opposite ends of the base sidewalls.

In order to prevent theft of the compact disc from the closed housing, the pivot pins that ensure the pivotably between cover and base are an integral part of the sidewall of the cover and have a radial projection at their distal end, whereby the sidewall of the base is provided with bores that match the shape of the pivot pins with their radial projections such that the bores have a corresponding two-step design. The pivot pins and radial projections are received in their entirety within the thickness of material of the base sidewalls. In this manner, it is impossible to separate the two halves of the housing by relative displacement and subsequent removal of the enclosed compact disc. Instead, it is only possible to open the cassette by pivoting.

In order to achieve a permanent and wear resistant support of the opened cover at the base for frequent opening of the housing, it is suggested that the pivot axis of the pivot connection between the cover and the base is located above the center line of the housing and that the cover, when the housing is completely opened, is supported with its entire length at the transversely extending outer edge of the top wall at the continuous transverse wall of the base above its bottom.

It is furthermore suggested that the top wall of the cover be provided with a slanted edge at the side which is facing the pivot connection between cover and base and that the slanted edge, when the housing is closed, rests with it entire length at a rounded or beveled transitional portion of a grip ledge of the plate insert. The grip ledge, which is positioned substantially as an extension of the top wall, has a transitional portion into a long connecting portion which connects the grip ledge to the rectangular base plate of the plate insert. In this manner, the stability and stiffness of the housing is increased. Especially, it is prevented that the top wall in the area of the edge portion can be pressed inwardly.

Finally, it is suggested that at least four main edges are rounded and have the contour of a quarter circle. The thus designed housing has an especially soft feel when held in the user's hand.

BRIEF DESCRIPTION OF THE DRAWINGS

The object and advantageous of the present invention will appear more clearly from the following specification in conjunction with the accompanying drawings, in which:

FIG. 2b shows the cassette represented in FIG. 1a with two compact discs arranged at the plate insert and a manual positioned within the cassette;

DESCRIPTION OF PREFERRED EMBODIMENTS

The present invention will now be described in detail with the aid of several specific embodiment utilizing FIGS. 1 through 11.

Figures 1A, 1B:
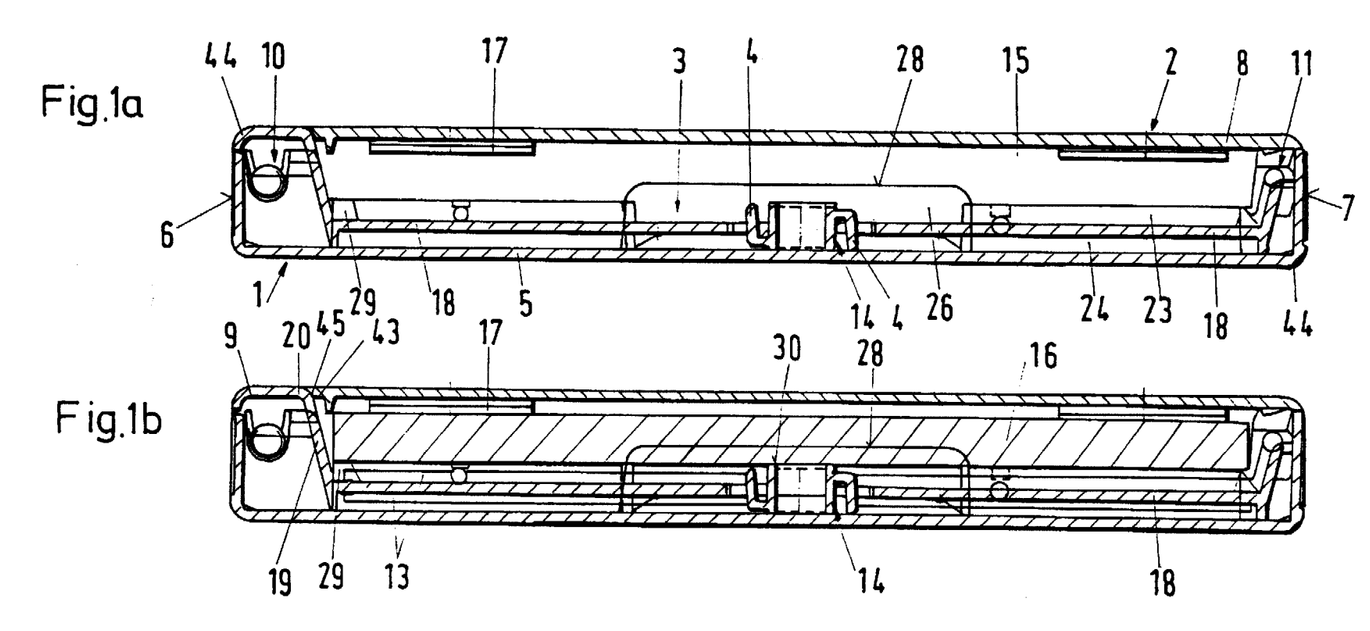
FIG. 1a shows in section an empty cassette, comprised of a base, a cover, and plate insert positioned therebetween.

The cassette represented in FIGS. 1a and 1b is comprised of a base 1 and a cover 2 forming a housing as well as a plate insert 3 received in the housing. The cassette has the following dimensions: length 141 to 143 mm; width 124 to 125.5 mm; height (thickness) 16 to 20 mm, preferably 17.3. The plate insert has securing elements 4 in the form of spring-elastic tongues on both plane sides of the plate insert. These securing elements 4 can engage the center hole of a disc for storing information, i.e., a so-called compact disc. Since the securing elements 4 project from both plane sides of the plate insert 3, at each plane side of the plate a disc may be fastened.

The base 1 is comprised of a rectangular bottom 5 and sidewalls surrounding the bottom whereby in FIG. 1a the continuous transverse sidewalls 6, 7 are shown. The cover 2 comprises a rectangular top wall 8 which closes off the housing in the upward direction. The top wall 8 is shorter than the bottom 5 whereby the strips that thus remain free are closed off by a grip ledge 9 formed on the plate insert 3. The grip ledge 9 and the top wall 8 are positioned in a common plane and thus define the upper side of the housing. The cover 2 comprises very narrow transverse walls so that the enclosure of the housing in the longitudinal direction is primarily provided by the transverse walls 6, 7 of the base 1.

The cassette is provided with two pivot connections which are comprised of integrally formed pivot pins. One pair of pivot pins 10 connects the cover 2 pivotably to the base 1. A further pair of pivot pins 11 connects the plate insert 3 pivotably to the base 1. The pivot pins 10 are positioned at one end and the pins 11 at the other end of the base 1.

When the cover 2 is pivoted about the pivot pins 10 into the open end position, and subsequently the plate insert 3 is pivoted about the pivot pins 11 into the open end position, the cassette is in a position represented in FIGS. 3 and 4 with respect to base 1, cover 2 and plate insert 3. In this position, the back side of the plate insert 3 faces upwardly, so that the compact disc positioned at the back side as well as the front side of the plate insert 3 can be removed from the housing or placed into the housing. When the plate insert 3 is pivoted onto base 1, the compact disc connected to the front side of the plate insert 3 can be removed.

Figure 2:
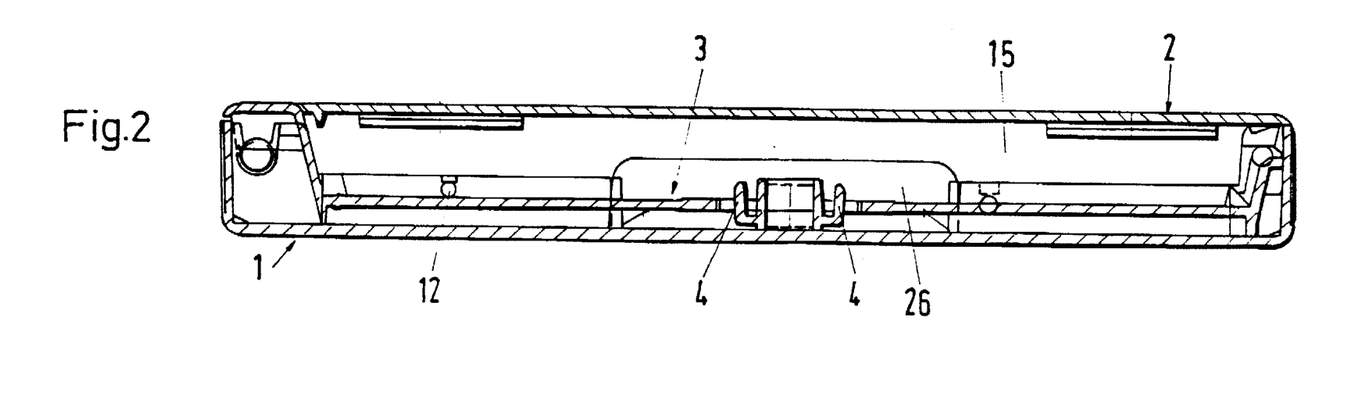
FIG. 2 shows in section a cassette with base and cover as shown in FIG. 1a but with only one compact disc positioned at the plate insert.

In an alternative embodiment of the cassette, shown in FIG. 2, the base 1 and cover 2 are identical to the aforedescribed embodiment. However, the plate insert 3 is provided with securing elements 4 in the form of spring-elastic tongues only at the plane side of the plate insert that faces upwardly so that only the upper side of the plate insert 3 can receive a compact disc. Since the plate insert 3 in this embodiment must not be pivotable, it is fastened within the base 1 by snap elements 12. The snap elements 12 are also represented in connection with FIGS. 1a and 1b; however, they have no particular function in this embodiment.

FIG. 1b shows the cassette of FIG. 1a when it is loaded on both plane sides of the plate insert 3 with discs 13. The compact discs 13 are provided, as is conventional, with center holes in which the spring-elastic tongues of the securing elements 4 are positioned in order to thus secure the disc 13 at the plate insert 3. The securing elements 4 are grouped about a central support 14 which is formed as an integral part of the plate insert 3. In the shown embodiment for two compact discs 13, the spring-elastic tongues or securing elements 4 extend alternatingly upwardly and downwardly, i.e., an upwardly extending spring-elastic tongue for the upper disc 13 is followed in the circumferential direction by a downwardly extending spring-elastic tongue for the lower disc etc. On both sides of the plate insert 3 an annular arrangement of the securing elements 4 in the form of spring-elastic tongues is thus provided.

Between the plate insert 3 resting on the bottom 5 and the top wall 8 there is thus a relatively large, rectangular free space 15. This free space 15 can be used for receiving information material 16 such as, for example, a manual or any other accompanying booklet having a thickness of 5 to 8 mm. The information material 16 can only be removed from the cassette when first the cover 2 has been pivoted outwardly. Only after removing the information material 16 is it possible to remove the upper compact disc 13 and, after pivoting the plate insert 3 outwardly away from the base 1, the lower disc 13 can also be removed. FIG. 1b shows that the cover 2 is provided with a total of four securing brackets 17 which extend parallel and slightly below the top wall 8. Between the securing brackets 17 and the top wall 8 a cover or a folded brochure can be inserted having a thickness of no more than 0.5 mm. The cover sheet is thus positioned directly below the transparent top wall 8 and provides the user with information with respect to the contents of the cassette. The cover sheet however is not necessarily required because, due to the transparent cover top wall 8, product information can also be directly read from the cover page of the manual or brochure 16.

Figure 5:
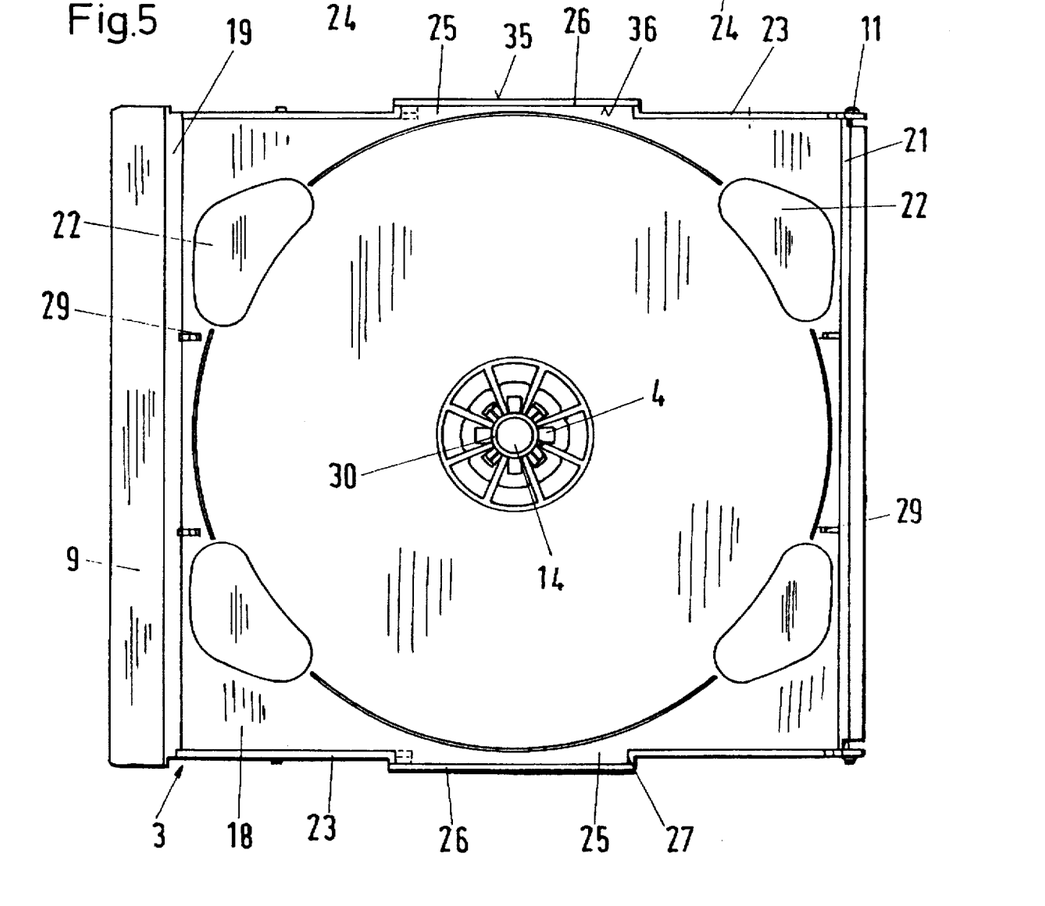
FIG. 5 shows a top view of the plate insert provided with securing elements for securing compact discs on both plane sides of the plate insert.
Figure 6:
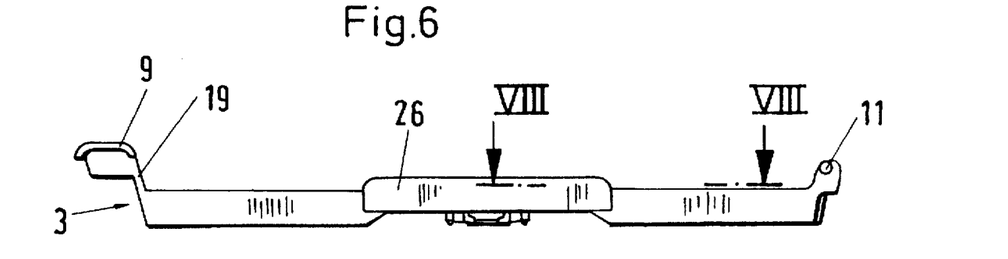
FIG. 6 shows a side view of the plate insert of FIG. 5.
Figure 7:
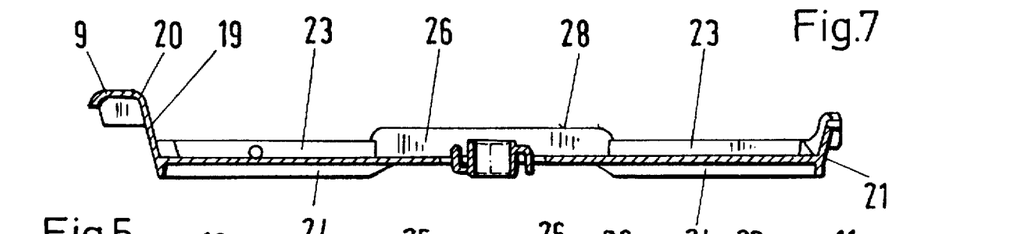
FIG. 7 shows a sectional view of the plate of FIG. 5.
Figure 8:
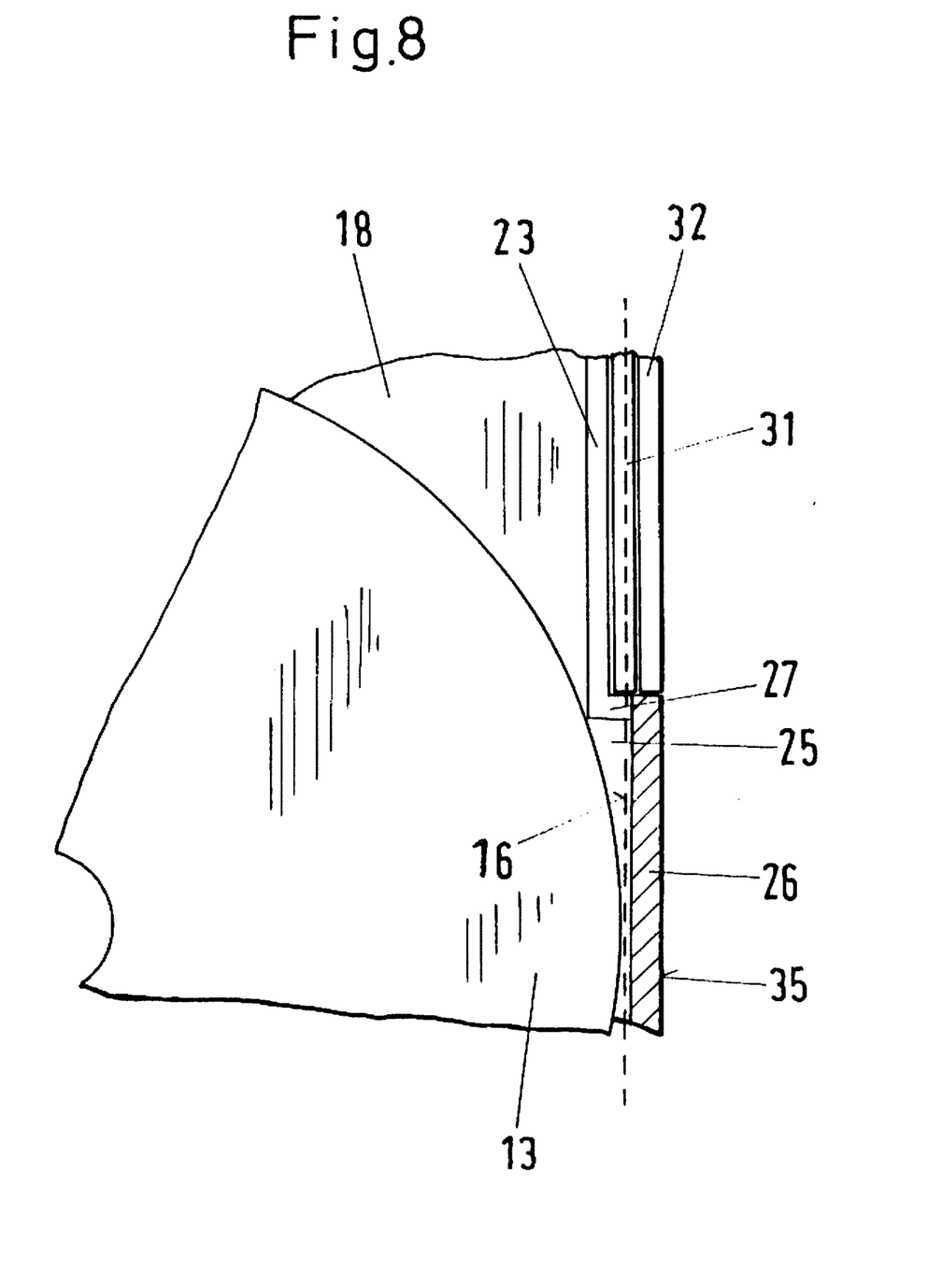
FIG. 8 shows a detail of the section along line VIII—VIII of FIG. 6 with compact disc positioned at the plate insert.

Further details of the plate insert 3 will be explained in the following with the aid of FIGS. 5 to 7. The plate insert 3 is comprised of a substantially rectangular base plate 18 which has integrally formed thereat the grip ledge 9 which extends transverse to the longitudinal extension of the plate 18 and is slightly raised relative to it. The plate insert 3 can be gripped at the grip ledge 9 in order pivot it outwardly relative to the base 1. The grip ledge 9 is connected to the plate 18 with a connecting section 19 extending over the entire width of the plate insert 3. The transitional portion 20 between the grip ledge 9 and the connecting portion 19 is slightly rounded. Grip ledge 9 and connecting section 19 extend over the entire width of the plate insert 3. At the oppositely arranged transverse edge a reinforcement rib 21 is formed which extends slightly outwardly and which is provided at its ends with the pivot pins 11. Four grip holes 22 make it possible that the compact disc which partially covers these grip holes can be removed easily.

Along the longitudinal edges the plate insert 3 is also provided with reinforcement ribs. The edges of the plate insert 3, over approximately ⅓ of its length, starting at the connecting section 19, respectively, the reinforcement rib 21, are provided with upwardly projecting sidewalls 23. Extending over the same length sidewall 24 is provided at the underside of the plate insert which serves for supporting the plate insert 3 on the bottom 5 of the base 1. The downwardly extending sidewall 24 further prevents that the plate insert 3 can bend downwardly.

The upwardly extending sidewall 23 as well as the downwardly extending sidewall 24 do not extend over the entire length of the plate insert 3, but extend only to a center portion which extends over ⅓ of the length of the plate insert 3. This center portion is characterized in that in this area the inserted compact disc with its circumference comes closest to the lateral edges of the plate insert 3. The base plate 18 of the plate insert 3 in this area deviates from the exact rectangular shape and at both lateral edges is provided with narrow rectangular projections 25 which are positioned exactly in the same plane as the plate 18. The outwardly positioned longitudinal edge of each lateral projection 25 is provided with a support wall 26 which extends upwardly in the direction toward the cover 2 of the cassette. The support wall 26 is connected via short connecting edges 27, extending along the narrow sides of the lateral projections 25, with the parallel sidewalls 23 that extend staggered relative to the support wall 26. The connecting edge 27 and the outwardly extending sidewall 23 have the same height. However, as can be seen especially in FIGS. 6 and 7, the support wall 26 is substantially higher than the sidewalls 23. When a compact disc is fastened in the predetermined manner to the upper side of the plate insert 3, the upper edge 28 of the support wall 26 projects upwardly to a substantial degree past the inserted compact disc.

In the area of the two transversely extending edges the plate insert 3 is provided with short ribs 29 which extend in the direction of the center of the plate insert 3 whereby the short ribs have a height that is identical to the height of the upwardly extending sidewalls 23. Finally, the support element 14 is provided with a central rest 30 the height of which corresponds to the height of the upwardly extending sidewalls 23. Thus, the outwardly extending sidewalls 23, the connecting edges 27, the short ribs 29, the upper rest 30 of the central support have the same height above the plate 18 so that with the aid of these individual components a support of the information material 16 at a plurality of support points is possible. FIG. 1b shows especially that the information material is simultaneously supported on the central support 30 as well as on the short ribs 29. The aforementioned support points are located at a higher level than the upper side of the compact disc 13 secured at the plate insert 3. A contacting of the sensitive disc 13 with the information material 16 positioned thereabove is thus substantially prevented.

In the longitudinal direction, the fixation of the information material 16, supported in the aforedisclosed manner, is realized by the connecting section 19 as well as the reinforcement rib 21. In the lateral direction, the information material 16 is exclusively fixed by the lateral edges of the support walls 26. Their height is selected for this purpose such that the upper edge 28 extends approximately to half the thickness of the information material 16. It is assumed that the thickness of the information material 16 is 5 to 8 mm. The distance between the two support walls 26 thus surpasses slightly the width of the information material. However, the distance between two oppositely arranged upwardly extending sidewalls 23 is less than the width of the information material 16. In this manner, it is ensured that the information material 16 is centered laterally by the support walls 26 but that, at the same time, the entire length of the upwardly extending sidewalls 23 provides a support surface in order to support the information material from below.

Figure 3:
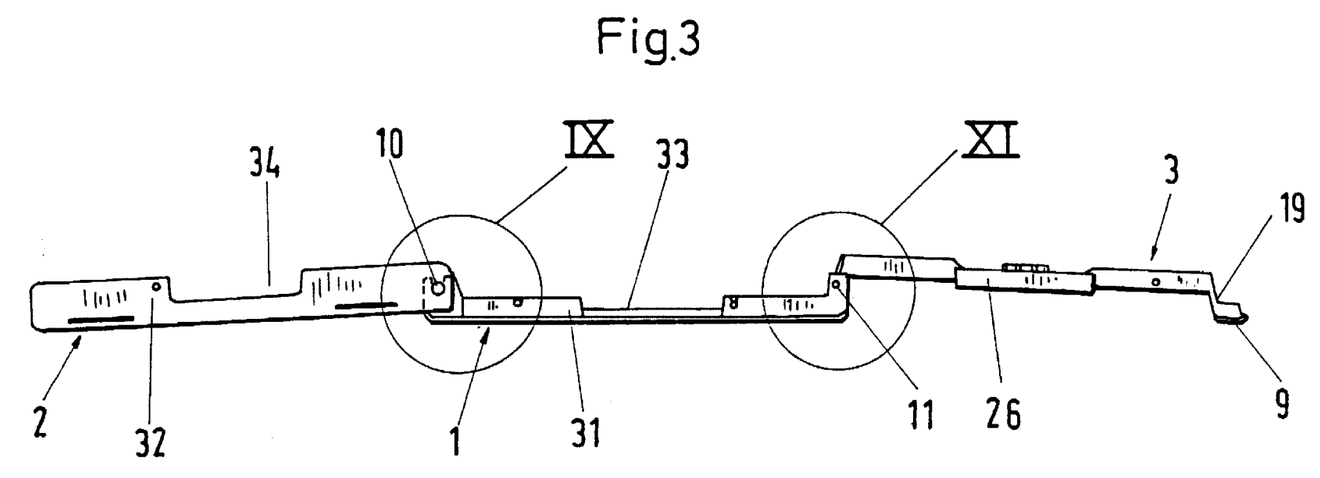
FIG. 3 shows a side view of the cassette of FIG. 1a in open end position.
Figure 4:
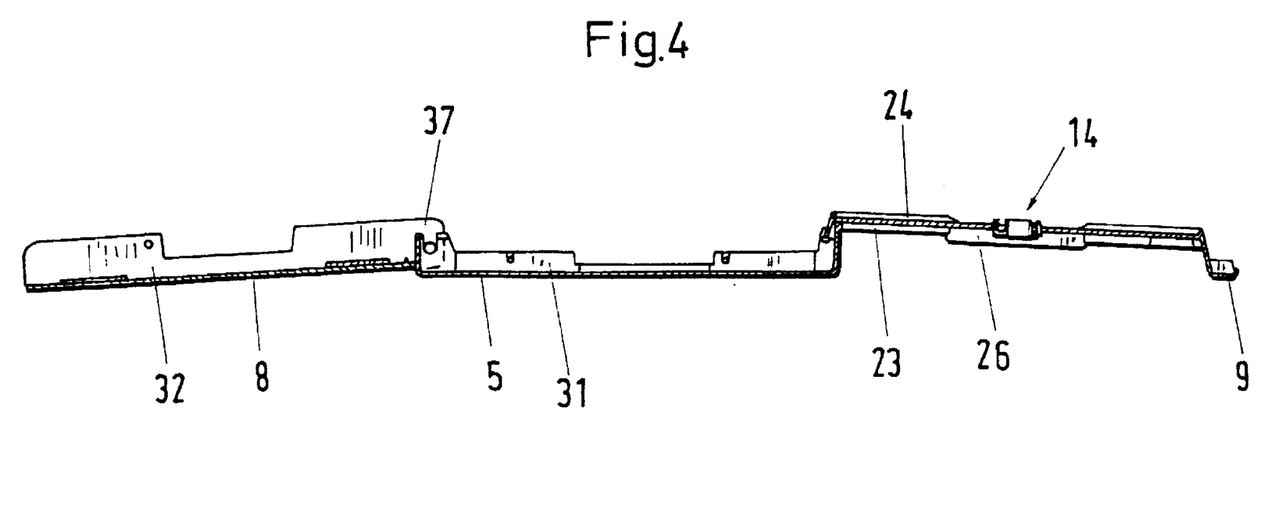
FIG. 4 shows a section of the cassette of FIG. 3 in the open end position.

In FIGS. 3 and 4 it is represented that base 1 and cover 2 have sidewalls 31, 32. These sidewalls 31, 32 do not extend continuously over the entire length, but are provided with cutouts 33, 34. The size of the cutouts 33, 34 is selected such that the support walls 26 fit flush within the cutouts 33, 34. The exterior side 35 of the support walls 26 is flush with the exterior side of the housing.

The sidewalls 31, 32 of the base 1 and the cover 2 overlap partially in the closed state of the housing whereby the sidewalls 32 of the cover 2 are positioned outwardly. Accordingly, in the area of the lateral projection 25 the support wall 26 geometrically correlates with the upwardly extending sidewall 23 of the plate insert 3, the side wall 31 of the base 1, and the sidewall 32 of the cover 2; see FIG. 8. In order to prevent that during closing of the cover 2 its sidewalls 32 collide with the information material 16 between the support walls 26, the inner side of the support wall 26 is positioned in the same plane or inwardly relative to the inner side of the sidewall 32 of the cover 2 and at the same time outwardly relative to the inner side of the sidewall 31 of the base 1. For a better understanding, the information material 16 is shown in a dashed line in FIG. 8.

Figure 9:
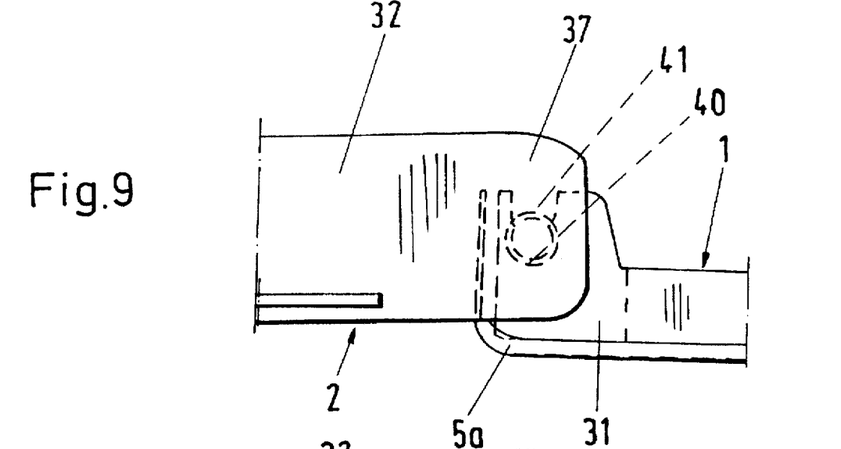
FIG. 9 shows in a detailed view of a portion (indicated with IX in FIG. 3) of the pivot connection between base and cover.
Figure 10:
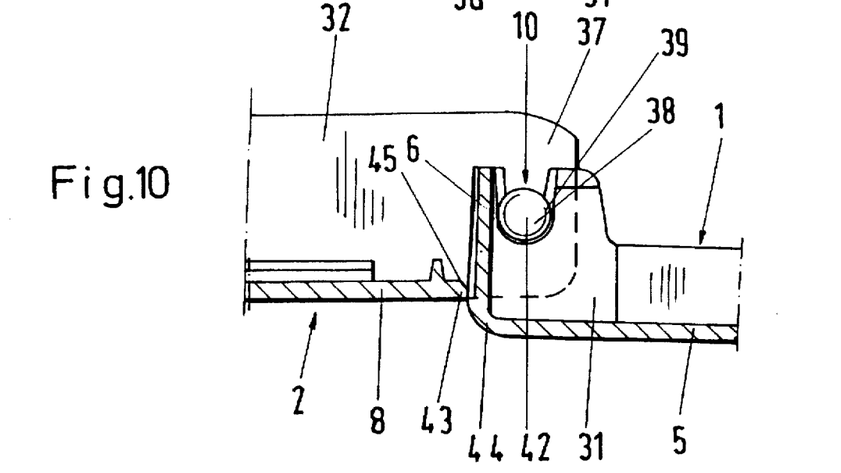
FIG. 10 shows a sectional view of the representation of the FIG. 9.
Figure 11:
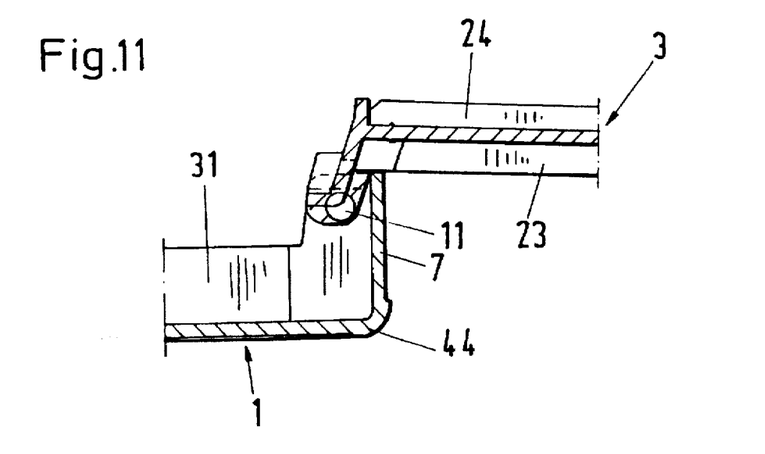
FIG. 11 shows a detail of a portion (indicated with XI in FIG. 3) of the pivot connection between base and plate insert.

Details of the pivot connection between the cover 2 and the base 1 are represented in FIGS. 9 and 10. The pivot pins 10 are connected to the inner side of the free legs 37 which are extensions of the side walls 32. The pivot pins 10 are comprised of a short cylindrical rotation pin 38 as well as a radial projection 39 which is a unitary part of the pivot pin. The rotation pin 38 as well as the radial projection 39 are received in a two-step bore 40 of the sidewalls 31 of the base 1. The rotational pins 38 and the radial projection 39 are sized such that the two parts are completely contained within the thickness (width) of the sidewall 31. The radial projection 39 prevents that the cover 2 can be separated from the base 1 by laterally bending the legs 37. For introducing the pivot pins 11 into the two-step bore 40, the bore 40 is provided with a key hole insertion slot 41.

The pivot axis 42 of the pivot pin is positioned substantially above half the height of the housing. When the cover 2 is completely opened, the cover 2 is thus not in the same plane as the base 1, but is slightly higher. For limiting the pivot travel of approximately 180°, a transversely extending edge 43 is provided at the top wall 8. In the completely open state it rests at the continuous transverse wall 6 of the base 1 above its bottom 5. This results in a linearly shaped and very wear-resistant support of the completely outwardly pivoted cover 2 at the transverse wall of the base 1. This supporting action is provided above the location of a quarter circle contour 44 between the transverse wall 6 and the bottom 5. Similar quarter circle contours are also provided at the other four main edges of the housing. Additionally, the sidewall 32 of the cover 2 in the open state rests on an exterior rib 5a provided as an extension of the bottom 5 and positioned exterior to the sidewall 32.

The slanted edge 43 provides an additional function for the cassette. The slanted edge 43, as can be seen, for example, in FIG. 1a, is provided with a slant 45. When the cassette is closed, the slanted portion 45 of the edge 43 rests over its entire length on the rounded transitional portion 20 which connects the grip ledge 9 of the plate insert 3 with a connecting section 19 of the base plate 18 of the plate insert 3. By resting the slanted portion 45 on the transitional portion 20, the top wall 8 is provided in this area with increased stability. The cassette can not be deformed at this location by pressure onto the top wall 8.

The present invention is, of course, in no way restricted to the specific disclosure of the specification and drawings, but also encompasses any modifications within the scope of the appended claims.

What we claim is:

1. A cassette for receiving a compact disk and information material having a thickness of up to 8 mm, said cassette comprising:
   a housing comprised of a base and a cover, said cover pivotably connected with a pivot connection to said base for opening and closing said housing;
   a plate insert positioned in said housing, said plate insert having securing elements for securing at least one compact disk thereat;
   said base having a rectangular bottom with opposite longitudinal edges;
   said base having upwardly extending first sidewalls connected to said longitudinal edges;
   said cover comprising a rectangular top wall extending parallel to said bottom, said top wall having opposite longitudinal edges;
   said cover having second sidewalls connected to said longitudinal edges, said second sidewalls extending downwardly when said housing is closed;
   said plate insert having a rectangular base plate with opposite longitudinal edges;
   said rectangular base plate having lateral projections in a plane of said base plate at said longitudinal edges in an area where a compact disk, when secured at said plate insert, is closest to said longitudinal edges;
   said plate insert having a central support for penetrating a central bore of a compact disk to be received in said housing;
   said lateral projections having a support wall extending parallel to said opposite longitudinal edges and having an upper edge projecting upwardly past said central support;
   said plate insert having upwardly extending third sidewalls connected to said opposite longitudinal edges of said plate insert and extending parallel to and inwardly displaced relative to said support walls, wherein said third sidewalls have upper end faces for supporting information material to be placed into said cassette on top of a compact disk to be secured at said securing elements;
   said central support having an upper rest and projecting to the same height above said rectangular base plate as said third sidewalls for supporting, together with said upper end faces of said third sidewalls, the information material;
   said support walls projecting past said upper end faces of said third sidewalls for centering the information material therebetween.

2. A cassette according to claim 1, wherein said first sidewalls have cutouts for receiving said lateral projections when said housing is closed.

3. A cassette according to claim 1, wherein said second sidewalls have cutouts for receiving said lateral projections and said support walls when said housing is closed.

4. A cassette according to claim 1, wherein, when said housing is closed:
   said second sidewalls are positioned exterior to said first sidewalls;
   said support walls have an inner side and said second sidewalls have an inner side, said inner side of said support walls positioned in a common plane with said inner side of said second sidewalls; and
   said first sidewalls having an inner side, said inner side of said support walls positioned outwardly relative to said inner side of said first sidewalls.

5. A cassette according to claim 1, wherein, when said housing is closed:

said second sidewalls are positioned exterior to said first sidewalls;

said support walls have an inner side and said second sidewalls have an inner side, said inner side of said support walls positioned inwardly relative to said inner side of said second sidewalls; and said first sidewalls having an inner side, said inner side of said support walls positioned outwardly to said inner side of said first sidewalls.

6. A cassette according to claim 1, wherein said support walls have an outer side and wherein, when said housing is closed, said outer side is flush with said first and second sidewalls.

7. A cassette according to claim 1, wherein said support wall has rounded corners facing said cover when said housing is closed.

8. A cassette according to claim 1, wherein said securing elements are connected to said central support.

9. A cassette according to claim 8, wherein said securing elements are elastic tongues arranged in an annular arrangement about a circumference of said central support.

10. A cassette according to claim 1, wherein said upper end faces are positioned at a same level as said upper rest.

11. A cassette according to claim 1, wherein said plate insert comprises transverse edges extending perpendicular to said longitudinal edges, said transverse edges having short ribs extending parallel to said longitudinal edges toward a center of said plate insert, wherein said short ribs have a height identical to a height of said central support.

12. A cassette according to claim 1, wherein said plate insert has a first and a second opposite plane sides, wherein said securing elements are positioned on said first and second opposite plane sides for securing a compact disk on each one of said opposite plane sides.

13. A cassette according to claim 12, wherein said plate insert has two first pivot pins and is connected with said pivot pins to said base so as to be pivotable about a pivot angle relative to said base.

14. A cassette according to claim 13, wherein said pivot angle is 180°.

15. A cassette according to claim 13, wherein said pivot connection comprises second pivot pins for pivoting said cover relative to said base, wherein said first pivot pins and said second pivot pins are connected to said base at opposite ends of said first sidewalls.

16. A cassette according to claim 15, wherein said second pivot pins are integrally connected to said second sidewalls of said cover, said second pivot pins having a distal end with a radial projection, wherein said first sidewalls have two-step bores matching said pivot pins, wherein said pivot pins with said radial projection are completely received in said two-step bores.

17. A cassette according to claim 1, wherein a pivot axis of said pivot connection is positioned above a center line of said cassette, wherein said cover has a transverse edge extending parallel to said pivot axis adjacent to said pivot connection, wherein said base has a transverse wall extending parallel to said pivot axis adjacent to said pivot connection, wherein when said cover is pivoted into an open end position, said cover rests with said transverse edge on said transverse wall of said base at a location above said rectangular bottom.

18. A cassette according to claim 1, wherein said plate insert comprises a grip ledge and a connecting portion for connecting said grip ledge to said rectangular base plate, wherein said rectangular top wall of said cover has a slanted edge extending parallel to and facing a pivot axis of said pivot connection, wherein said grip ledge extends parallel to said pivot axis and has a transitional portion providing a transition into said connecting portion, wherein, when said housing is closed, said slanted edge rests over its entire length on said transitional portion, wherein said grip ledge, when said housing is closed, forms an extension of said top wall of said cover.

19. A cassette according to claim 18, wherein said transitional portion is rounded.

20. A cassette according to claim 18, wherein said transitional portion is beveled.

21. A cassette according to claim 1, wherein said housing has outer edges and wherein at least four of said outer edges are rounded so as to have the contour of a quarter circle.

* * * * *